United States Patent [19]

Kramer et al.

[11] Patent Number: 5,076,411

[45] Date of Patent: Dec. 31, 1991

[54] TWO-HANDLE ARRANGEMENT FOR A HANDHELD PORTABLE TOOL

[75] Inventors: Jochen Kramer, Stuttgart; Hans-Peter Dohse, Kernan/Rommelshausen, both of Fed. Rep. of Germany

[73] Assignee: Andreas Stihl, Waiblingen, Fed. Rep. of Germany

[21] Appl. No.: 571,103

[22] Filed: Aug. 23, 1990

[30] Foreign Application Priority Data

Sep. 5, 1989 [DE] Fed. Rep. of Germany ....... 3929441

[51] Int. Cl.$^5$ .......................... F02D 11/02; F16P 3/18
[52] U.S. Cl. .......................... 192/131 R; 123/198 D; 30/381
[58] Field of Search ............... 192/129 R, 130, 131 R; 30/381, 382, 383; 83/814; 123/198 D; 56/233

[56] References Cited

U.S. PATENT DOCUMENTS

| 3,361,165 | 1/1968 | Irgens | 30/381 |
| 4,028,804 | 6/1977 | Hammond | 30/382 |
| 4,543,723 | 10/1985 | Bortfeld et al. | 30/381 |
| 4,959,906 | 10/1990 | Moore, Jr. | 30/381 |

FOREIGN PATENT DOCUMENTS

| 48019 | 3/1982 | European Pat. Off. | 192/131 R |
| 3023033 | 1/1982 | Fed. Rep. of Germany | 193/131 R |
| 8716112 | 3/1988 | Fed. Rep. of Germany | |
| 2139329 | 11/1984 | United Kingdom | 192/131 R |

Primary Examiner—Richard Lorence
Attorney, Agent, or Firm—Walter Ottesen

[57] ABSTRACT

The invention relates to a two-handle arrangement for a handheld portable tool having a drive motor and equipped with forward and rearward handles for two-handled operation. Each of these handles includes respective actuating elements which can be actuated only in a specific sequence. First, force must be applied to the actuating element on the forward handle and only when a corresponding actuation of the throttle lever takes place is there an increase in the speed of the drive motor. The invention is especially suited for handheld portable tools equipped with an internal combustion engine such as motor-driven chain saws, hedge trimmers and the like.

8 Claims, 4 Drawing Sheets

TWO-HANDLE ARRANGEMENT FOR A HANDHELD PORTABLE TOOL

FIELD OF THE INVENTION

The invention relates to a two-handle arrangement for a handheld portable tool equipped with an internal combustion engine. The portable tool has a forward handle and a rearward handle to permit two-handed operation thereof and each of the handles has an actuating element. The first actuating element arranged on the rearward handle is provided for controlling the speed of the drive motor and the second actuating element mounted on the forward handle provides a safety control and is operatively connected to the first actuating element.

BACKGROUND OF THE INVENTION

German Utility Model 87 16 112 discloses a handheld portable tool of the kind described above. For reasons of safety, the arrangement in this portable tool is so configured that the drive motor is driven back to its idle speed or is brought to standstill when one of the two handles is released. With this measure, a significant step for the safety of the operator is achieved. Situations often arise in which the operator releases the forward handle whereby the motor is brought to idle speed or to standstill even though the actuating element controlling the speed of the drive motor is pressed to the end stop and thereafter the operator again grasps the forward handle and actuates the switch mounted there. This causes the condition that the drive motor is again brought to its maximum speed so that the handheld portable tool is subjected to jolt-like movements which the operator possibly cannot manage or can manage only with extreme exertion.

SUMMARY OF THE INVENTION

It is an object of the invention to provide a two-handle arrangement for a handheld portable tool wherein inadvertently initiated jump-like speed changes are avoided and a safe handling of the tool is provided.

The two-handle arrangement of the invention is for a handheld portable tool having a motor housing for accommodating a motor therein for driving a work tool, the motor being controlled via a throttle pull line and the two-handle arrangement being provided to permit two-handed operation of the tool by an operator. The two-handle arrangement includes: a forward handle connected to the housing; a rearward handle connected to the housing rearward of the forward handle; actuator means for actuating the drive motor of the portable tool, the actuator means being mounted in the rearward handle so as to be movable between a start position corresponding to a standstill condition of the work tool and an operating condition wherein the drive motor drives the work tool; throttle redirect means for actuating the throttle pull line for acting on the motor; coupling detent means interposed between the throttle redirect means and being movable between a coupling position wherein the actuator means can be coupled to the throttle redirect means and a decoupling position wherein the actuator means is decoupled from the throttle redirect means; enable means operatively connected to the coupling detent means and being mounted in the forward handle so as to be movable from a rest position corresponding to the decoupling position into an active position for moving the coupling detent means into the coupling position; and, the coupling detent means and the throttle redirect means conjointly defining interface means for permitting a force-transmitting connection to be established between the actuator means and the throttle redirect means via the interface means only when the coupling detent means is in the coupling position and the actuator means is in the start position.

An essential advantage of the invention is seen in that the drive motor of the handheld portable tool does not undergo any rapid increases in speed when the forward handle is suddenly grasped by the operator so that the tool remains reliably controllable. The operator must deliberately maintain the sequence of actuations. This leads to the condition that the speed control of the drive motor takes place in a controlled manner.

A throttle lever is provided as the first control element. The throttle lever is preferably pivotally journalled and biased by a spring in the direction of its start position. The spring is braced on the inner wall of the hold portion of the rearward handle. In this way, the condition is assured that the throttle lever is always guided back to its start position when the throttle lever is released so that an increase in speed always takes place starting from idle speed.

According to a preferred embodiment, a redirect lever is mounted on the pivot pin of the throttle lever and the throttle linkage is connected to this redirect lever. A detent pawl defines the coupling element between the throttle lever and the redirect lever. With this detent pawl, it is possible to move both levers simultaneously and in the same direction in the same manner as if they were a common component and to freely pivot both levers toward each other when decoupled. Preferably, the detent pawl is pivotable within limits and coacts with the redirect lever when force is applied to the second actuating element.

The redirect lever has essentially a V-shaped configuration with the throttle linkage being attached to one leg of the V-form with the end of the other leg defining a stop face for the detent pawl. The second actuating element is connected with the detent pawl by means of a Bowden cable; that is, when a pull force is applied to the Bowden cable, the detent pawl lies with a corresponding coupling face against the strike face of the redirect lever whereby the throttle lever, detent pawl and the redirect lever conjointly function as a rigid component in this condition. For this purpose, and with reference to the pivot axis of the detent pawl, a first portion of the detent pawl coacts with the strike face of the redirect lever and at a second portion, attachment means are mounted for the Bowden cable. The wire of the Bowden cable is guided through an opening in a strut of the throttle lever and the Bowden cable casing is braced on this strut. A pressure spring coaxially surrounds the Bowden wire and this spring is mounted between the detent pawl and the strut. At one of its ends, the pressure spring is braced against the strut and at the other end thereof, the pressure spring is braced on a bearing face of the detent pawl. This affords the advantage that the detent pawl as well as the second actuating element are returned into the unactuated start position when there is no application of force to the second actuating element.

In another embodiment, the detent device is in the form of a detent piece and is journalled in the throttle lever so as to be linearly displaceable such that the detent piece coacts with a redirect lever when force is applied to the second actuating element.

In this alternative embodiment, the detent piece has essentially the form of a pin and a bore is provided in the redirect lever into which the detent piece can be guided. This arrangement provides a force-tight connection in the coupled condition since the parts interengage when force is applied to the second actuating element. A pressure spring acts to return the detent piece when the forward handle is released. This pressure spring is braced in a guide in which the detent piece is journalled. The Bowden cable can be guided through a bore in the redirect lever so that no redirection of the movement of the Bowden wire to the detent piece is required. The casing of the Bowden cable is held in a seat on the rearward handle.

A safety pawl is provided as a second actuating element. This safety pawl extends along the forward handle in the form of a U-shaped member to facilitate reliable manipulation thereof. The safety pawl is mounted so as to be pivotable about a rotational axis lying remote from the point where force is introduced. This U-shaped safety pawl is preferably mounted in a slot of the forward handle wherein it recesses when force is applied.

BRIEF DESCRIPTION OF THE DRAWINGS

The invention will now be described with reference to the drawings wherein:

FIG. 5 illustrates the arrangement wherein it functions as a detent to prevent a reswitch-on;

DESCRIPTION OF THE PREFERRED EMBODIMENTS OF THE INVENTION

Figure 1:
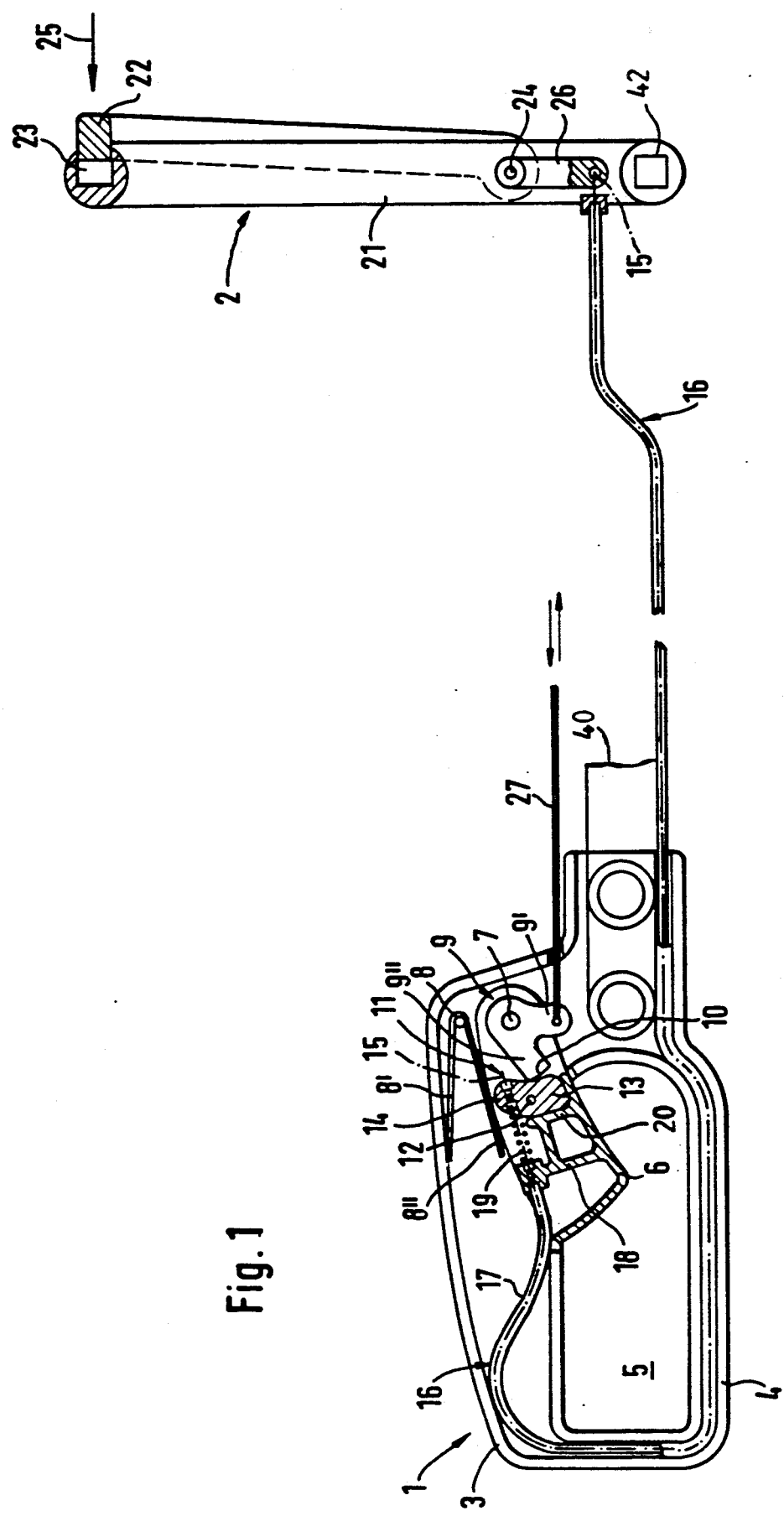
FIG. 1 is a longitudinal section view taken through the rearward and forward handles which are shown in schematic representation.

FIG. 1 shows a rearward handle 1 and a forward handle 2 which correspond to a handheld portable tool not shown in greater detail. The rearward handle 1 is connected to the motor housing (not shown) via structure 40. The rearward handle 1 includes a hold portion 3 having a bracket 4 extending beneath the hold portion 3 with an opening 5 disposed between the hold portion 3 and the bracket 4 through which the fingers of the hand can extend. A throttle lever 6 acts as the first actuating element and extends from the hold portion 3 into the opening 5. The throttle lever 6 is pivotally mounted to pivot about a rotational axis 7. The position of the throttle lever 6 shown in FIG. 1 is the start position thereof into which the throttle lever 6 is returned by a leg spring 8 which biases the lever 6. The leg spring 8 is braced with its one leg 8' against the inside of the hold portion 3 whereas the leg 8" coacts with the throttle lever 6.

A redirect lever 9 is pivotally mounted next to the throttle lever 6 in such a manner that its rotational axis is also the rotational axis 7 of the throttle lever 6. The redirect lever 9 has an essentially V-shaped configuration with one leg 9' acting to receive a throttle linkage 27. A second leg 9" of the redirect lever 9 extends essentially in the direction of the throttle lever 6 and has a stop face 10 which faces a rotationally movable detent pawl 11 mounted in the throttle lever 6. The detent pawl 11 has a pivot axis 12 and includes two portions referred to the pivot axis. Of these two portions, a first portion 13 coacts with the stop face 10 of the redirect lever 9 and a wire 15 of a Bowden cable 16 is hooked into the second portion 14. The Bowden cable casing 17 braces against a strut 18 of the throttle lever 6 and the wire 15 of the Bowden cable is guided through an opening in the strut 18. A pressure spring 19 coaxially surrounds the wire 15 of the Bowden cable and is mounted between the second portion 14 of the detent pawl 11 and the strut 18. The detent pawl 11 is resiliently biased by pressure spring 19 in the direction of its rest position whereby the detent pawl 11 lies with its first portion 13 against a further strut 20 of the throttle lever 6.

The forward handle 2 is connected to the motor housing of the portable tool at 42. The forward handle 2 includes a bracket-like hold portion 21 having a safety pawl 22 extending along the hold portion. The safety pawl 22 constitutes the second actuating element and is mounted in a slot 23 of this hold portion. The safety pawl 22 is pivotable about a rotational axis 24. Arrow 25 indicates the direction of force applied to the safety pawl 22 and shows that the rotational axis 24 is disposed at an end of the safety pawl which is remote from the surface at which the force is introduced. An intermediate lever 26 transmits the actuation of the safety pawl 22 to the Bowden cable 16 whose wire 15 is connected to one end of the intermediate lever 26. In this way, the detent pawl 11 can be pivoted against the pressure spring 19 via the Bowden cable 16 when the safety pawl 22 is actuated whereby the first portion 13 with its contact face comes into contact engagement with the stop face 10 of the redirect lever 9 and this, in turn, causes the throttle lever 6 to be coupled with the redirect lever 9 for pivot movement about the rotational axis 7. This operation is explained in greater detail with respect to FIGS. 2 to 5.

Figure 2:
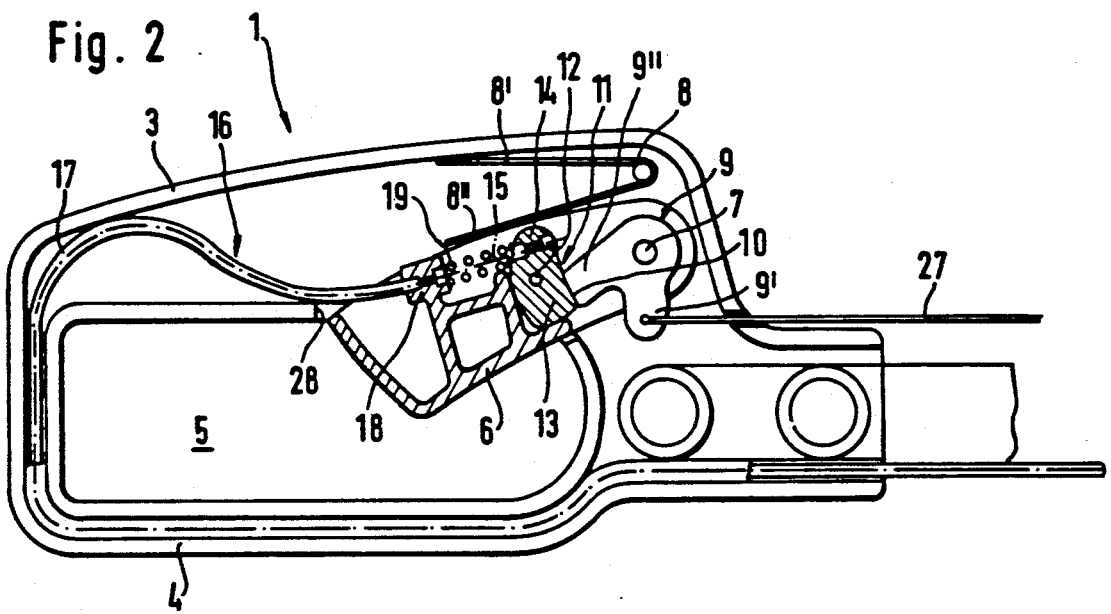
FIG. 2 is a schematic of the rearward handle showing the throttle lever in the start position.

FIG. 2 shows the rearward handle 1 which is configured primarily by the hold portion 3 and the bracket 4. The throttle lever 6 extends out of the hold portion 3 through an opening 28 and into the opening 5 between the bracket 4 and the hold portion 3. The safety pawl 22 (FIG. 1) on the forward handle is actuated so that a pull force is applied to wire 15 of the Bowden cable. In this way, the detent pawl 11 is rotated about its pivot axis 12 to the extent that the first portion 13 lies against the stop face 10 of the leg 9" of the redirect lever 9. In this position of the detent pawl, the throttle lever 6, the detent pawl 11 and the redirect lever 9 conjointly act as a single rigid component since the pivot pin 12 of the detent pawl 11 is fixedly mounted in the throttle lever 6 and the force-tight contact of the portion 13 against the stop face 10 does not permit a relative movement of the detent pawl 11 relative to the redirect lever 9.

Figure 3:
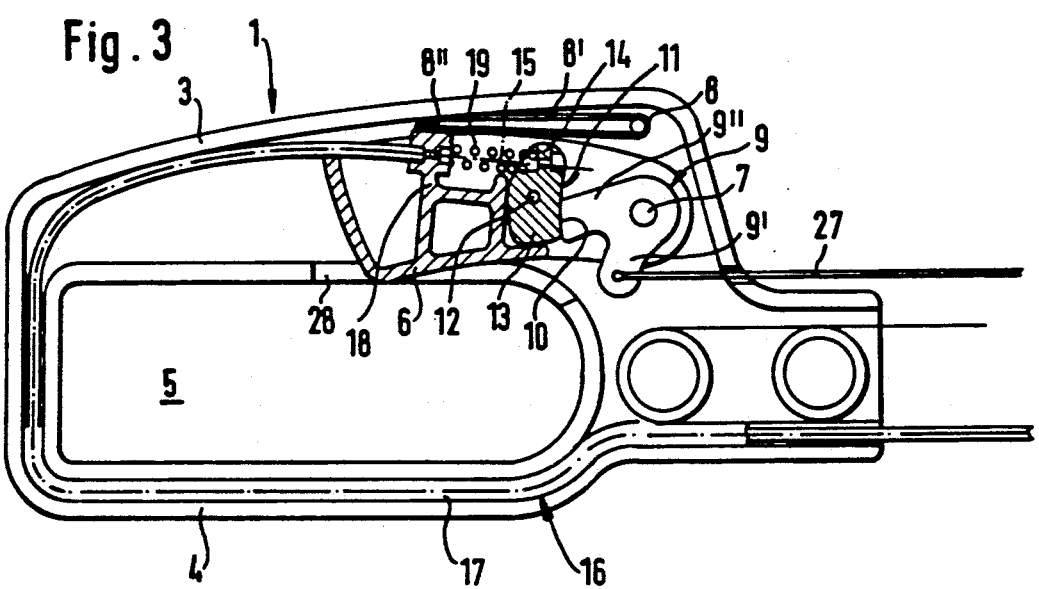
FIG. 3 is a schematic of the rearward handle showing the throttle lever in the fully depressed position.

If it is now intended to increase the speed of the motor above idle, the throttle lever 6 is actuated in that it is pressed upwardly into the hold portion 3 as shown in FIG. 3. The throttle lever 6 is pivoted about the rotational axis 7 with the redirect lever 9 passing through precisely the same pivot movement thereby actuating the throttle linkage 27. Actuating the throttle lever 6 causes the leg spring 8 to be placed under stress so that this spring tends to pivot the throttle lever 6 into its start position when the throttle lever is released by the operator. This return movement is likewise transmitted to the redirect lever 9 so that the speed of the drive motor is correspondingly reduced.

Figure 4:
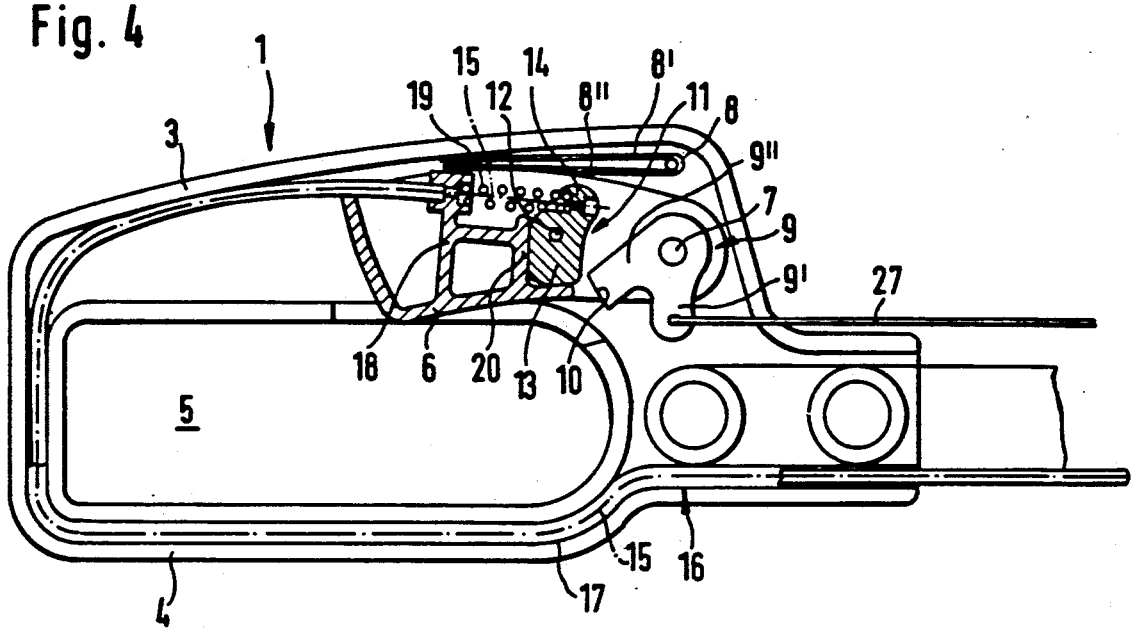
FIG. 4 is a schematic of the rearward handle with the components decoupled.

FIG. 4 shows an arrangement wherein the safety pawl 22 of FIG. 1 is released; that is, the operator releases the hand grip on the forward handle 2 whereby the pressure spring 19 pivots the detent pawl 11 into the initial position so that the first portion 13 of the detent pawl 11 lies in contact engagement with the strut 20. Even though the throttle lever 6 continues to be pressed completely in the upward direction, it is possible for the redirect lever 9 to pivot back into its start position (counterclockwise) because it is unlatched from the detent pawl 11 whereby the throttle linkage 27 is displaced and the drive motor is returned to idle speed.

Figure 5:
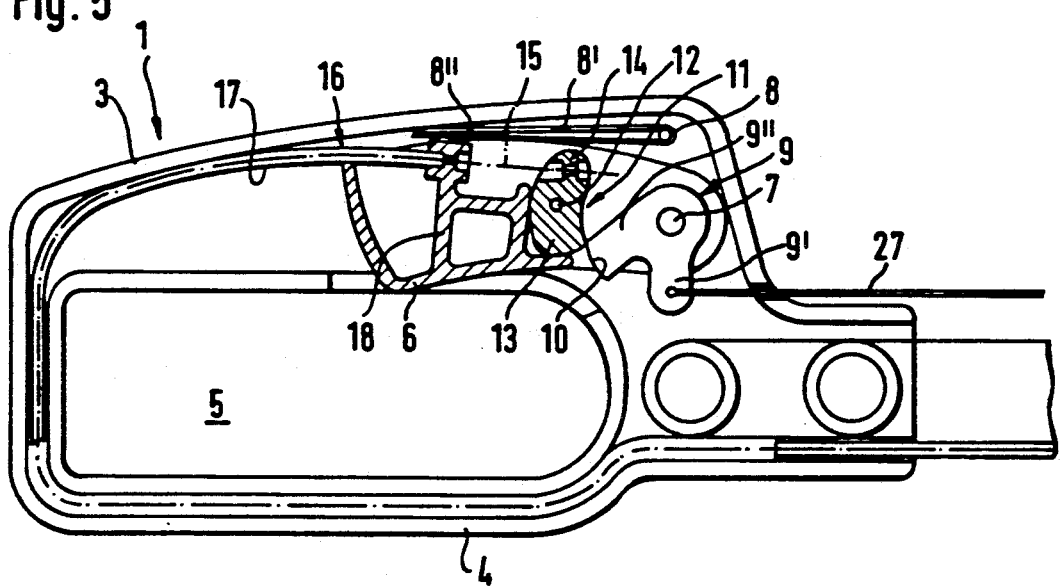

If the operator now determines the drop in speed, it is not possible to again bring the motor up to high speed by grasping the forward handle because, as shown in FIG. 5, the actuation of the safety pawl 22 effects a pivot movement of the detent pawl 11 whereby the latter however cannot be brought into engagement with the redirect lever 9 when the throttle lever is actuated. Instead, as shown in FIG. 5, the first portion 13 strikes an edge of the leg 9" with its edge whereby the redirect lever 9 is blocked and held in its start position. In this way, this arrangement acts as a detent against reswitch-on when the throttle lever 6 is actuated.

To increase the speed of the drive motor above idle speed, the throttle lever 6 must therefore first assume the position shown in FIG. 1 and only thereafter is it possible to bring detent pawl 11 into engagement with redirect lever 9 by grasping the forward handle 2 and applying force to the safety pawl 22 in the direction of arrow 25 (FIG. 2). The speed of the drive motor can now be increased by actuating the throttle lever 6 upwardly as shown in FIGS. 2 and 3.

Figure 6:
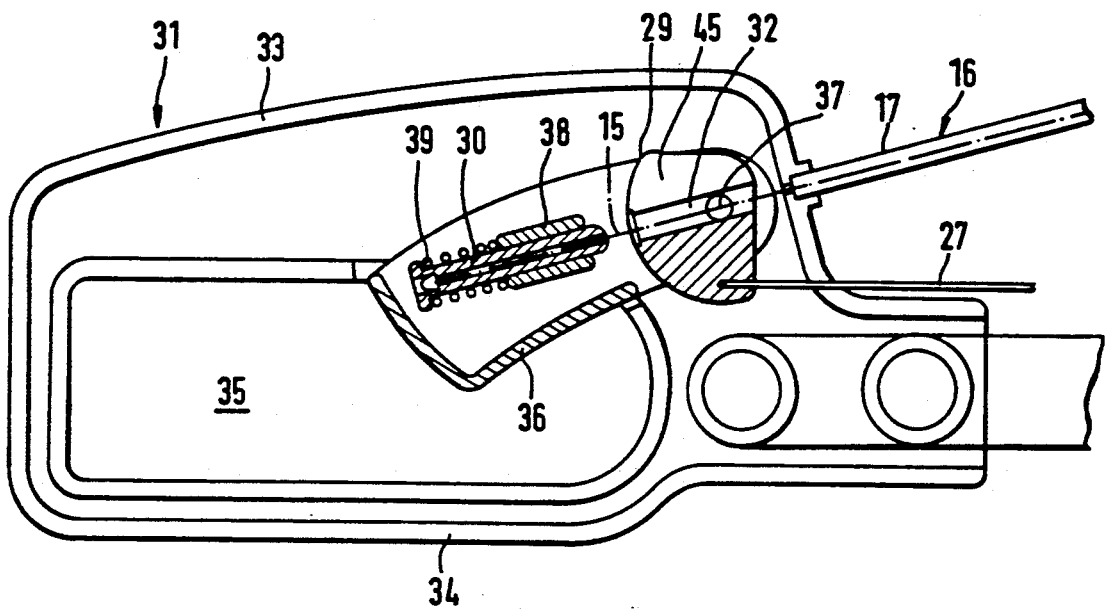
FIG. 6 is a schematic of the rearward handle showing a decoupled condition for another embodiment wherein the detent piece is in the form of a detent pin; and, FIG. 7 shows the rearward handle of FIG. 6 for a coupled condition.
Figure 7:
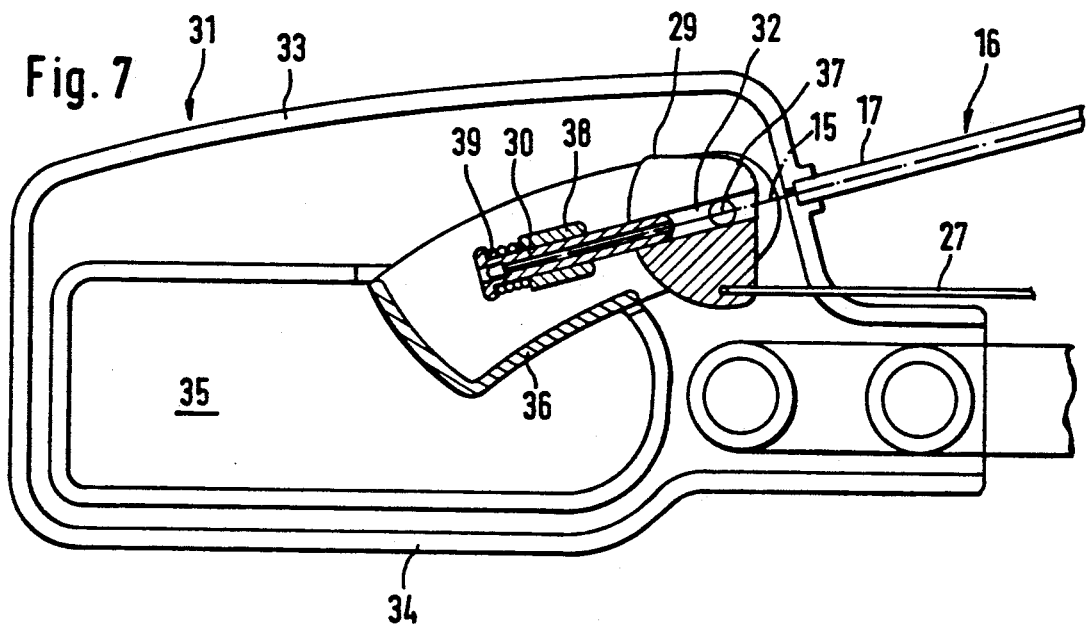

A rearward handle 31 is shown in FIGS. 6 and 7 which comprises a hold portion 33 and a bracket 34 extending beneath this hold portion 33. An opening 35 is provided between the hold portion 33 and bracket 35 for permitting the fingers of a hand to extend therethrough. A throttle lever 36 is shown extending from the hold portion 33 into the opening 35. The throttle lever 36 is journalled to pivot about rotational axis 37 with FIGS. 6 and 7 showing the throttle lever 36 in its start position. A redirect lever 29 is mounted next to the throttle lever 36 and has a rotational axis which is also the rotational axis 37 of the throttle lever 36. The redirect lever 29 has a bore 32 extending perpendicularly to the rotational axis 37. The bore 32 extends substantially in the longitudinal direction of the throttle lever 36. In addition, a slot 45 is provided in the redirect lever 29 and lies in the pivot plane. The slot 45 is at right angles to the rotational axis 37 and extends along the entire length of the bore 32. The slot is likewise open at the outer periphery of the redirect lever 29 so that the wire of the Bowden cable can be placed laterally into the bore 32. The width of the slot 45 is advantageously somewhat smaller than the diameter of the bore 32.

In the throttle lever 36, a detent piece 30 is linearly displaceably journalled in a guide 38. The detent piece 30 is so configured and mounted that it can be introduced into the bore 32 of the redirect lever 29 when the throttle lever 36 is in the start position (see FIG. 7). The redirect lever 29 is pivoted with the pivoting action of the throttle lever because of the form-tight interengagement of detent piece 30 and the redirect lever 29. In this way, the throttle linkage 37 is actuated in the manner already described.

The detent piece 30 is actuated by means of the Bowden cable 16 and the jacket 17 of the Bowden cable is braced on the hold portion 33 and the wire 15 of the Bowden cable is guided through the bore 32 of the redirect lever 29 and attached to the detent piece 30. A pressure spring 39 acts to decouple the detent piece 30 from the redirect lever 29 when the safety pawl 22 of the forward handle is released.

As shown above, a specific sequence of actuations must be deliberately carried out by the operator which requires that the handheld portable tool be manipulated with both hands.

It is understood that the foregoing description is that of the preferred embodiments of the invention and that various changes and modifications may be made thereto without departing from the spirit and scope of the invention as defined in the appended claims.

What is claimed is:

1. A two-handle arrangement for a handheld portable tool having a motor housing for accommodating a motor therein for driving a work tool, the motor being controlled via a throttle pull line and the two-handle arrangement being provided to permit two-handed operation of the tool by an operator, the two-handle arrangement comprising:

a forward handle connected to the housing;

a rearward handle connected to the housing rearward of said forward handle;

actuator means for actuating the drive motor of the portable tool, said actuator means being mounted in said rearward handle so as to be movable between a start position corresponding to a standstill condition of the work tool and an operating position wherein the drive motor drives the work tool;

throttle redirect means for actuating the throttle pull line for acting on the motor;

coupling detent means interposed between said throttle redirect means and said actuator means, said coupling detent means being movable between a coupling position wherein said actuator means can be coupled to said throttle redirect means and a decoupling position wherein said actuator means is decoupled from said throttle redirect means;

enabling means operatively connected to said coupling detent means and being mounted in said forward handle so as to be movable from a rest position corresponding to said decoupling position into an active position for moving said coupling detent means into said coupling position;

said coupling detent means and said throttle redirect means conjointly defining interface means for permitting a force-transmitting connection to be established between said actuator means and said throttle redirect means via said interface means only when said coupling detent means is in said coupling position and said actuator means is in said start position;

said actuator means including: a pivot pin mounted in said handle and defining a pivot axis; a throttle lever pivotally mounted in said rearward handle on said pivot pin; and, resilient biasing means for resiliently biasing said throttle lever into said start position;

said throttle redirect means being a redirect lever pivotally mounted on said pivot pin so as to be pivotally movable relative to said throttle lever; and, said throttle pull line being connected to said redirect lever;

said coupling detent means being a displaceable detent pin slideably mounted on said throttle lever so as to be movable between said coupling and decoupling positions for engaging said redirect lever when said throttle lever is in said start position and said detent pin is in said coupling position; and, said interface means being first and second surfaces formed respectively on said detent pin and said redirect lever for coacting to transmit force from said throttle lever to said redirect lever via said detent pin.

2. The two-handle arrangement of claim 1, said redirect lever having a bore formed therein for receiving said detent pin therein when said detent pin is in said coupling position and said throttle lever is in said start position.

3. The two-handle arrangement of claim 2, said coupling detent means further including a guide formed on said throttle lever for slideably journalling said detent pin thereon; and, a pressure spring for resiliently biasing said detent pin into said decoupling position.

4. The two-handle arrangement of claim 2, said enabling means including an enabling lever pivotally mounted in said forward handle; and, a Bowden cable interconnecting said enabling lever and said detent pin; said Bowden cable having a casing and a wire disposed in said casing; said rearward handle having a seat formed thereon for holding said casing; and, said wire extending from said casing and through said bore of said redirect lever and being connected to said detent pin.

5. The two-handle arrangement of claim 1, said forward handle being a U-shaped handle; and, said enabling means including a U-shaped pawl having a bight portion for receiving a force applied by the operator and being pivotally mounted in said U-shaped handle so as to pivot in the region of the bottom of said forward handle.

6. The two-handle arrangement of claim 5, said forward handle having a slot formed therein for receiving said U-shaped pawl when the operator applies a force to said bight portion.

7. The two-handle arrangement of claim 1, said rearward handle having an inner wall surface defining an inner space; and, said resilient biasing means being interposed between said inner wall surface and said throttle lever.

8. The two-handle arrangement of claim 7, said resilient biasing means being a leg spring.

* * * * *

UNITED STATES PATENT AND TRADEMARK OFFICE
CERTIFICATE OF CORRECTION

PATENT NO. : 5,076,411

DATED : December 31, 1991

INVENTOR(S) : Jochen Kramer and Hans-Peter Dohse

It is certified that error appears in the above-identified patent and that said Letters Patent is hereby corrected as shown below:

On the title page, items [73] and [57]:
    In the title page, under "Assignee": delete "Andreas Stibl" and substitute -- Andreas Stihl -- therefor.

In the title page, in the Abstract, line 4: delete "handled" and substitute -- handed -- therefor.

Signed and Sealed this

Thirteenth Day of April, 1993

Attest:

STEPHEN G. KUNIN

*Attesting Officer*    Acting Commissioner of Patents and Trademarks